Sept. 20, 1966     L. J. WINDECKER     3,273,833
AIRFOIL STRUCTURE
Filed Jan. 21, 1965     2 Sheets-Sheet 2
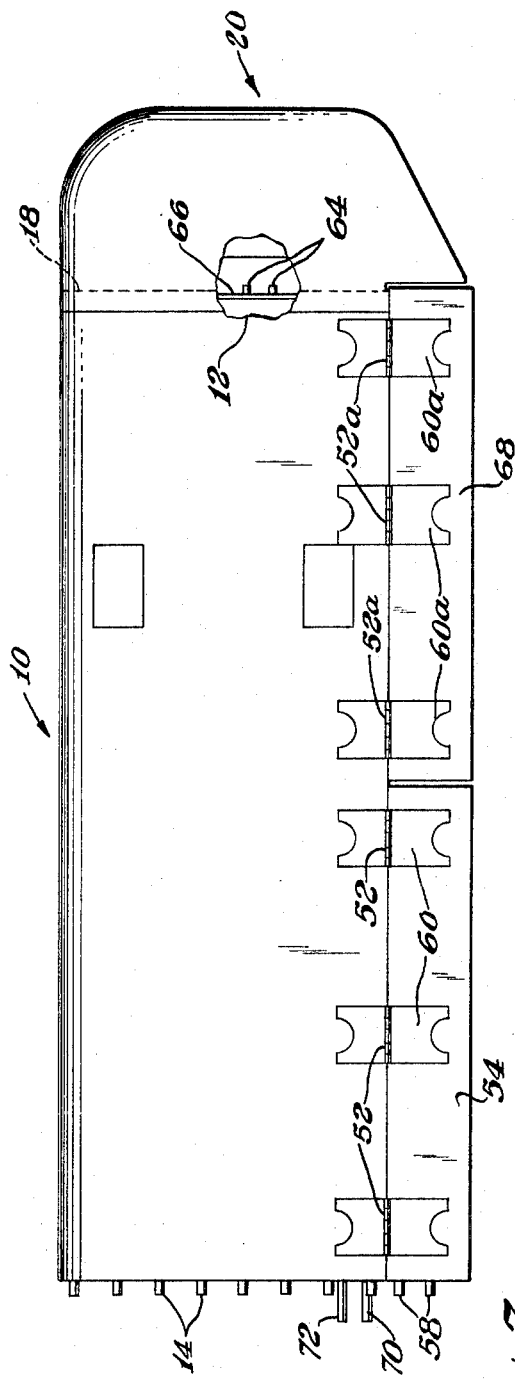
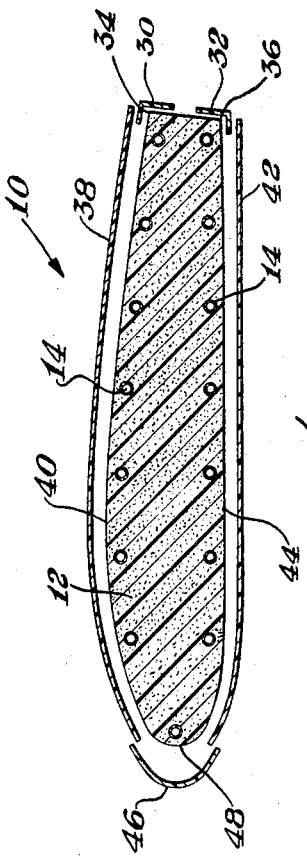
INVENTOR.
Leo J. Windecker
BY Earl D. Ayers
AGENT

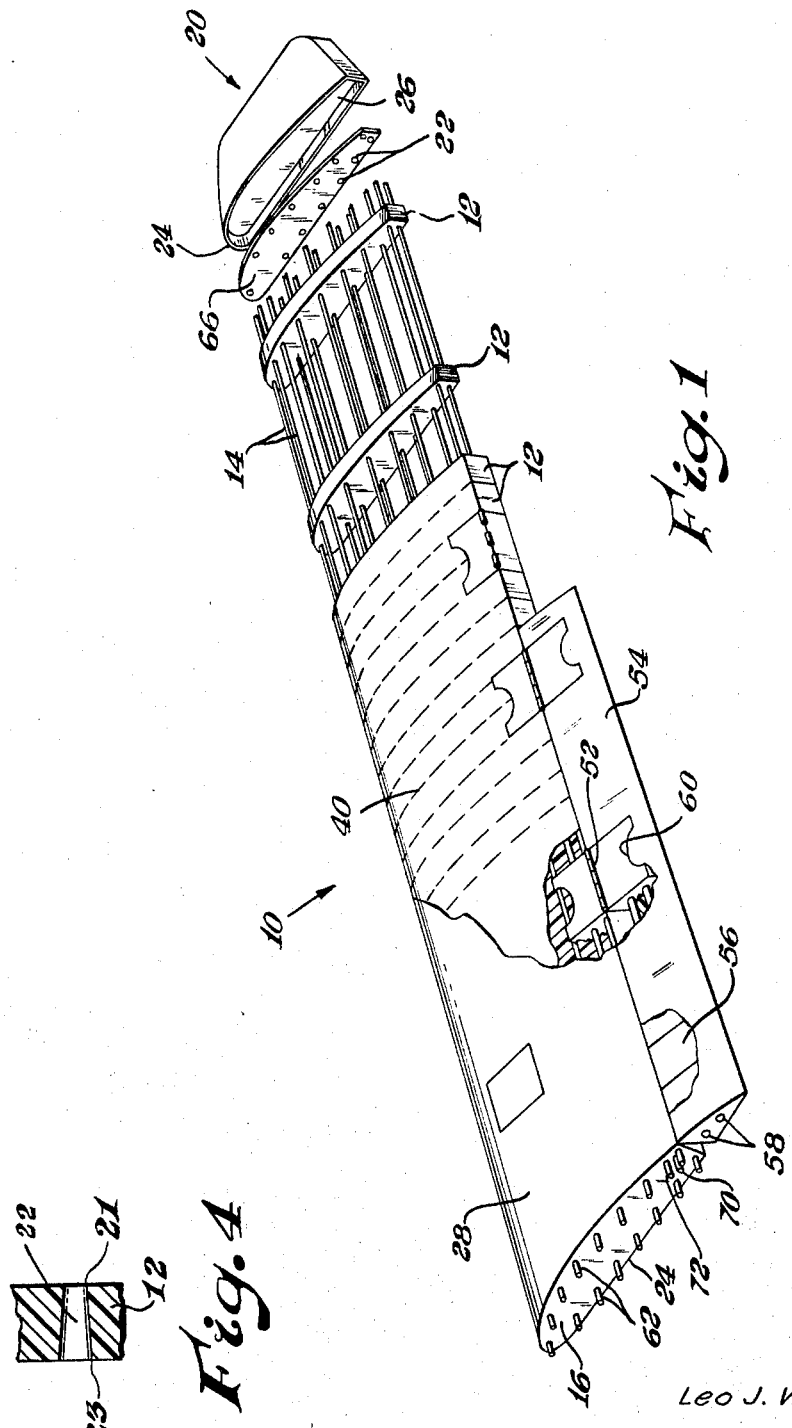

United States Patent Office 3,273,833
Patented Sept. 20, 1966

3,273,833
AIRFOIL STRUCTURE
Leo J. Windecker, Midland, Tex., assignor to The Dow Chemical Company, Midland, Mich., a corporation of Delaware
Filed Jan. 21, 1965, Ser. No. 438,143
36 Claims. (Cl. 244—123)

This application is a continuation-in-part of my co-pending application Serial No. 212,575, filed July 26, 1962, now abandoned.

This invention relates to an improved airfoil structure having a cellular plastic core and to its method of manufacture. It relates to more particularly to an improved unitary wing structure having increased strength and to a simplified and time-saving method of manufacturing such a structure.

For many years the materials of construction and basic aircraft wing design have remained in the same stage of development employing ribs, bracing members, stringers of wood or aluminum, skins of fabric or riveted alloys of light metals, e.g. aluminum. Wing design, therefore, has been limited by the materials of construction to a narrow range of strengths, weights, and design characteristics.

Some attempts have been made in recent years, however, to fabricate wing structure to having a cellular plastic core which is light in weight which is covered by a variety of skins including aluminum and fiberglass. In some instances, stiffener elements such as aluminum I beams, L beams or box spars have been employed to add strength and rigidity to the structure. However, such prior art wing structures have, in general, been found to be unsuitable for use on commercially licensed aircraft because of their inability to withstand one or more of the forces, such as, shear, compression, vibration, torque, tension, etc. that are encountered in flight. These wings, in general, employ the foam core as a filler to maintain the airfoil shape of the skin.

It is, therefore, an object of this invention to provide an airfoil structure having improved weight, strength and fatigue characteristics.

It is a further object of this invention to provide an improved, simplified and easy to construct airfoil structure having desirable weight, strength and fatigue characteristics.

The invention, as well as additional objects and advantages thereof, is described in the following detailed description, reference being made to the accompanying drawings wherein:

FIGURE 1 is an isometric view of a partly assembled wing structure with portions cut away to show internal structure;

FIGURE 2 is a cross-sectional view of an airfoil structure made in accordance with this invention showing the application of the skin thereto. The flap of the wing is not shown in order to simplify the drawing;

FIGURE 3 is a plan view of a wing made in accordance with this invention, and

FIGURE 4 is a fragmentary view of a core section 12.

In the various figures, like numerals designate like parts.

The wing, indicated generally by the numeral 10, shown in FIGURES 1, 2 and 3 comprises a central or core part composed of rigid foamed core sections 12, usually made of polyurethane, which are cemented together with a suitable adhesive, usually an epoxy resin, at each interface. Spars 14, usually aluminum or glass fiber reinforced rigid plastic hollow elements, extend through and are rigidly secured to an aluminum base plate or root attachment rib 16 disposed at the inboard end of the wing and run longitudinally to the outer end, indicated generally by the number 18 (see FIG. 3), of the wing, excluding the wing tip, which is indicated generally by the numeral 20. The spars 14 pass through bores 22 in the core sections 12 and are bonded to the walls of the bores 22 therein with, as mentioned previously, an epoxy resin or other suitable adhesive. As shown in FIGURE 4, the outboard end 21 of the bore 22 is of smaller diameter than the inboard end 23 of the bore 22. Thus, as the core section is advanced during assembly over the spars 14 which have previously been coated with suitable adhesive material, the adhesive is drawn from the spar 14 into the slight cavity on the inboard side of the core element 12 (due to the diameter of end 21 of bore 22 being a close fit over the spar 14 and end 23 of bore 22 being of larger diameter), making a positive bond between the section 12 and the spars 14.

The wing tip 20 is likewise composed of foam core elements which are precut to shape as are the core elements 12 and are bonded together. The wing tip 20 is covered with a skin 24 of glass fiber which is bonded to the core sections by a suitable adhesive described previously herein. The end core section 26 of the wing tip which adjoins the wing 10 is bonded to the wing. The glass fiber skin covering the wing tip extends beyond the inboard end of the wing tip 20 and, like the core section 26, is bonded to the outer surface of the wing. The tip and wing thus form a unitary structure. The wing structure 10, like the wing tip 20, is covered with a skin 28 which is composed of epoxy resin impregnated glass fiber in sheet form, the skin 28 being bonded to the foamed core sections 12 with a suitable adhesive, such as an epoxy resin adhesive. Each of the core sections 12 is preferably preformed (as by cutting, for example) to the desired airfoil shape, the bores 22 being predrilled and forming an array which is disposed adjacent to the peripheral surface to which the skin 28 is to be attached. The bores 22 of the array are spaced apart an amount which permits the sections 12 to be threaded over the spars 14.

The spars 14 are usually prepositioned on a jig and coated with curing epoxy resins so that the core sections 12 may be positioned thereon and all interfaces between the tubular spars 14 and the foam core sections may be bonded together, as previously described, with a polymeric insoluble adhesive such as epoxy resin, for example.

FIGURE 2 is a transverse cross-sectional view of the wing structure (without the wing flap 54) showing a preferred manner of applying the epoxy resin and the resin impregnated woven glass fiber skin 28 to the assembled core structure. Elongated strips 30 and 32, respectively, made of epoxy impregnated woven glass fiber and which usually are preformed to the bending radius of the trailing edges, are first bonded to the upper and lower trailing edges 34, 36, respectively, of the wing section 10 by means of an epoxy resin adhesive. An elongated sheet of epoxy impregnated woven glass fiber 38 which is as wide as the width of the wing and as long as the length of the wing is then bonded to the upper surface 40 of the wing section 10 by means of an epoxy resin adhesive. An elongated sheet of epoxy impregnated woven glass fiber 42, similar to the sheet 38, is then bonded to the lower side 44 of the wing by means of an epoxy resin adhesive. Finally, an elongated strip of epoxy impregnated woven glass fiber 46 is bonded by means of an epoxy resin adhesive to the leading edge 48 of the wing section, overlapping sheets 38 and 42.

It has been discovered that a wing or airfoil structure made from bonded together cellular foam core sections, tubular spars and a glass fibered skin, in accordance with this invention, is light in weight yet sufficiently strong and rugged to withstand, with a substantial safety margin, the stress, compression, torque and vibration encountered in flight. In order to achieve the requisite light weight together with the necessary strength characteristics, it has been found necessary to form the wing structure of abutting foamed core sections bounded to elongated spars which extend through the core sections near the peripheral surfaces thereof with an insoluble polymeric adhesive. The core sections 12 are made of a foamed, cellular polymer having a tensile strength of at least 40 lbs./in.$^2$, a compression strength of at least 25 lbs./in.$^2$, which is less than 3 lbs./ft.$^3$ in density, and, preferably, which is insoluble in hydrocarbons. It is preferred to make the core sections from a cellular polymeric material having a tensile strength of between 50 and 75 lbs./in.$^2$, a compression strength of at least 35 lbs./in.$^2$ and a density of less than 2 lbs./ft.$^3$. Polyurethane rigid foam is preferred, but other foamed polymers such as polystyrene, phenol-formaldehyde, epoxy, and other synthetic foamed materials as well as foamed metals, such as aluminum, having suitable density, would also be suitable.

In order to achieve the purpose of this invention, it is desirable for the elongated tubular spars which extend laterally through the foam core elements to be spaced equidistant from one another, to be arranged in vertical pair (that is, one above the other as viewed looking endwise into the wing structure) and to be positioned not less than ⅜ inch nor greater than 1 inch below the surface of the foam of the core section it penetrates. The skin covering of the wing structure must be separated from the metal spars throughout. Where external attachment to the spars 14 is necessary as in the case of wing braces or strut attachments, a flexible material (not shown) such as a silicone rubber, for example, should separate the skin from any metal attachment to the basic wing structure. It is desirable to have a minimum of an upper and lower pair of spars 14 for each chordwise center of pressure location within the wing. This normally requires a minimum of three pairs of spars, i.e one pair of spars for the high angle of attack center of pressure, one for the low angle of attack center of pressure and one for the inverted flight center of pressure. Many designs include an additional pair of spars for the cruising angle of attack center of pressure. The centers of pressure referred to in this application are those used in conventional stress analysis in the field of aeronautics.

In a conventional wing structure of the type usually used on relatively light weight aircraft, the center of pressure varies as the angle of attack of the wing varies, i.e. as the angle of attack of the wing increases, the center of pressure moves toward the trailing edge of the wing. It is felt that the multispar, foam filled construction used in wings made in accordance with this invention provides a more efficient structure than is obtainable by conventional construction methods, particularly in regard to its ability to withstand the varying load conditions described above.

It is desirable in this structure to make the spars 14 of tubing which is as thin walled as is practical, consistent with mechanical handling and strength. In general, however, tubing from 0.25 to 1.25 inches in outside diameter and from 0.010 to 0.05 inch wall thickness is suitable for use in wings intended for usage on light aircraft.

A wing structure made in accordance with this invention has the ability to stress relieve itself by more or less equally distributing the force moments throughout the wing structure rather than having point or area applied force moments which are common to other wing structures. It is this improved force distribution which provides wings built in accordance with this invention with exceptional strength for any given weight as compared to wings constructed in a conventional manner.

The insoluble polymeric adhesive usually employed is an epoxy resin but other adhesives such as polyesters, polyurethanes, and phenol-formaldehyde condensates may also be used and are within the scope of this invention.

It is likewise necessary, in accordance with this invention, that the wing be covered with a hard, smooth, impact resistant skin whose surface is bonded to the abutting surfaces of the core sections of the wing. Usually, the skin is made of epoxy resin impregnated woven glass fibers which gives improved strength and impact resistance, is easy to apply and shape, and will adhere well to the foamed core sections. However, materials such as polyester impregnated woven glass fibers or aluminum would, for example, also be suitable as the skin material.

A right wing section was constructed in accordance with this invention as described below. An aluminum base plate or root attachment rib 16 (see FIG. 1) was fitted into a jig (not shown) and 17 of the spars 14 were inserted into holes provided therefor around the periphery of the root attachment rib or base plate 16 and were secured to the plate. The spars 14 are made of 0.750 inch outside diameter aluminum tubing having a wall thickness of 0.035 inch and were regularly spaced 6 inches apart and 0.75 inch inward from the peripheral surface of the metal base plate 16. Core sections 12 of rigid polyurethane foam were preshaped into airfoil sections 4 inches wide. The core sections 12 were predrilled with an array of tapered bores 22, the bores being 0.813 inch in diameter at the large end and 0.748 inch in diameter at the smaller end to receive the tubular spars 14. As the first foam core section approached the base plate 16 on the spars 14, the outside surface of the aluminum base plate 16 and the first eight inches of the tubular spars 14 were covered with liquid epoxy resin containing an amine curing catalyst and aluminum powder. The core section was then moved into place with one of its side surfaces abutting against the resin coated surface of the base plate 16. As the next core section was being moved down the tubular spars, the face of the first core section 12 from which the spars 14 extended and the next eight inches of the exterior surface of the tubular spars 14 (the core sections were eight inches or less in width) were coated with catalyzed epoxy resin and the second core section 12 was moved firmly against the first section to make wall to wall abutting surface contact therewith. Alternatively, and especially where wide core sections 12 are used, the abutting surfaces of adjacent core sections need not be bonded together. The process of joining together core sections over the spars was repeated with other core sections until a wing panel (without a wing tip) was completed. When the abutting surfaces of core sections are bonded together with epoxy adhesive, the adhesive, when cured, forms a stiffener element which is in effect, bonded to each adjacent core section. At appropriate points, as shown in FIG. 1, core sections having modified (shortened) rear end parts were used so that flap hinges 52 and their associated flap hinge boxes 60 could be attached to the spars 14 near the trailing edge of the wing. The flap 54 is made of vertically laminated foam sections 56 and has two longitudinally extending central spars 58. Flap hinge boxes 60 are coupled to the spars 58 on the flap 54 and to the spars 14 for attachment to the wing structure. As this wing section was to be used on a high wing aircraft, no provision was made for wheel wells. A solid wing panel section forming a 12 foot long half wing section (without a wing tip) and having a 60″ chord and a Clark Y airfoil was then completed by bonding together more core sections 12 over the spars 14.

The tubular spars 14 extend 3 inches beyond both the base plate 16 on the inboard end of the wing structure and also beyond the core section 12 which is at the outer end of the wing structure. Those ends of the spars 14 which extend through the base plate 16 are fitted with solid threaded inserts 62 or other suitable means for attachment to a high wing mount (not shown). A terminal plate 66 fits over the tubing ends 64 extending through the core sections at the outer end of the wing structure and abuts against and is bonded to the side surface of the outermost core section. The wing tip section 20 is then secured to the outboard end of the wing as described previously.

Hinges 52a and their hinge plates or boxes 60a for the mounting of an aileron 68 (see FIG. 3) are mounted on the wing structure and on the aileron structure in a manner similar to that used in attaching the flap 54 to the wing structure. Actually, the flap and aileron in the wing illustrated in FIG. 3 are of the same structure, the difference being in the type and degree of motion allowed the members by their control mechanisms. The control mechanism, which is of conventional construction, is not shown in the drawings except where the control rods 70, 72 extend through and from the root or base plate 16.

After completion, the above described wing panel, weighing 120 lbs., was subjected to a standard wing loading correspond to above 9 g.'s (or 7650 lbs.) for over 1 hour with no indication of failure. A complete wing structure was constructed according to this invention and was mounted on a standard Monocoupe type aircraft. Flight tests proved the wing to be not only aerodynamically sound, but superior in many characteristics to the standard wing.

The foam core wing of this invention was patterned in configuration and external dimension after the standard Monocoupe wing and therefore forms a good basis of comparison therewith. A complete Monocoupe wing having wooden spars, ribs and stringers covered with linen is 16′ long including the tip, has a 60″ chord, a Clark Y airfoil and weighs 258 lbs. This wing is known to have an ultimate strength of 10,150 lbs. as compared with a total strength of 15,300 lbs. for the foam core wing.

To demonstrate, however, that foam core wings with aluminum spar reinforcement do not generally have superior strength when compared to a conventional wing, a wing of the same dimensions as those above was prepared in a similar manner but employed two box beam aluminum spars or stiffeners used in conjunction with foam core sections. One spar was placed in the forward portion of the wing and the other in the after portion of the wing. Together these spars amounted to more aluminum by weight than is used in the wing structure of this invention. The completed wing panel had a total weight of 123 lbs. and an ultimate strength of less than 4347 lbs.

Thus, wings made in accordance with this invention are easy to fabricate with relatively simple manufacturing equipment and are inherently stronger per unit of weight than are wings of similar size made in accordance with prior art construction forms and methods.

While wings made in accordance with this invention have been described in connection with core sections which are "solid" foamed structures, it is recognized that parts of some of the core sections must of necessity have cut out parts. For example, the core elements must have bores extending transversely therethrough to permit actuation of the flap and aileron by their control rods 70, 72. Structural elements such as the hinge boxes 60, 60a, require that some part of one or more core sections be cut away to permit mounting of the boxes to the spars. While not illustrated in the drawings, it is anticipated that suitable cutouts could be provided in the core sections to permit a fuel cell, for example, to be installed therein and bonded to the wing structure without departing from the spirit of this invention.

What is claimed is:

1. An aircraft airfoil structure which comprises a core consisting of a structurally rigid foam, a multiplicity of elongated spars running longitudinally through bores in said core from end to end thereof, said spars being spaced apart and disposed between ⅜ inch and one inch from the outer surface of said core and being continuously bonded to the walls of said bores along the length of the spars extending through said bores, and a skin, said skin covering said core and being integrally bonded thereto.

2. An airfoil structure in accordance with claim 1, wherein said spars are elongated hollow tubes.

3. An airfoil structure in accordance with claim 1, wherein said skin is composed of woven glass fibers impregnated with an epoxy resin.

4. An airfoil structure in accordance with claim 1, wherein said skin and said spars are bonded to said core by an epoxy resin.

5. An airfoil structure in accordance with claim 1, wherein said spars are substantially parallel with one another.

6. An airfoil structure in accordance with claim 1, wherein a root attachment plate is bonded to said core and said spars at one end of said structure.

7. An airfoil structure in accordance with claim 1, wherein said rigid foam is polyurethane.

8. An airfoil structure in accordance with claim 1, wherein a wing tip section is secured to one end of said structure.

9. An airfoil structure in accordance with claim 1, wherein said spars are made of glass fiber reinforced plastic material.

10. An airfoil structure in accordance with claim 1, wherein said spars are aluminum tubing.

11. An airfoil structure in accordance with claim 1, wherein adjacent spars are spaced apart about 6 inches.

12. An airfoil structure in accordance with claim 1, wherein said rigid foam is a foamed, cellular polymer having a tensile strength of at least 40 pounds per square inch, a compression strength of at least 25 pounds per square inch, and is less than 3 pounds per cubic foot in density.

13. An airfoil structure in accordance with claim 1, wherein said rigid foam is a cellular polymeric material having a tensile strength of between 50 and 75 pounds per square inch, a compression strength of at least 35 pound per square inch and a density of less than 2 pounds per cubic foot.

14. An airfoil structure in accordance with claim 1, wherein said rigid foam is phenol-formaldehyde.

15. An airfoil structure in accordance with claim 1, wherein said rigid foam is polystyrene.

16. An airfoil structure in accordance with claim 1, wherein said rigid foam is a foamed light metal alloy.

17. An airfoil structure in accordance with claim 1, wherein said rigid foam is an epoxy.

18. An airfoil structure in accordance with claim 1, wherein most of said spars are arranged in vertical pairs as viewed looking endwise into the structure.

19. An airfoil structure in accordance with claim 1, wherein said rigid foam is insoluble in hydrocarbons.

20. An aircraft wing structure which comprises a core having pre-shaped sections of a structurally rigid foam, said sections being bonded together as an elongated composite core structure, a multiplicity of tubular spars running longitudinally through said core structure from end to end thereof, said spars being spaced apart from one another and disposed adjacent to the periphery of said core structure and being bonded thereto, and a skin, said skin covering said core structure and being bonded thereto, whereby said core structures, said spars and said skin form an integral structure.

21. A structure in accordance with claim 20, wherein said skin is composed of woven glass fibers impregnated with an epoxy resin.

22. A structure in accordance with claim 20, wherein said skin and said spars are bonded to said core by an epoxy resin.

23. A structure in accordance with claim 20, wherein said spars are substantially parallel with one another.

24. A structure in accordance with claim 20, wherein a root attachment plate is bonded to said core and said spars at one end of said structure.

25. A structure in accordance with claim 20, wherein said rigid foam is a composite member comprising a plurality of sections bonded together in side-to-side relationship.

26. A structure in accordance with claim 25, wherein said rigid foam is polyurethane.

27. A structure in accordance with claim 25, wherein said core sections are bonded together with an epoxy resin.

28. A structure in accordance with claim 25, wherein said core sections are pre-drilled to accommodate said spars.

29. A structure in accordance with claim 20, wherein a wing tip section is secured to one end of said structure.

30. A structure in accordance with claim 20, wherein said structure is a Clark Y type airfoil.

31. A structure in accordance with claim 20, wherein said structure has a leading edge and a trailing edge, and a flap and an aileron structure are coupled to said trailing edge.

32. A structure in accordance with claim 20, wherein said rigid foam is phenol-formaldehyde.

33. A structure in accordance with claim 20, wherein said rigid foam is polystyrene.

34. A structure in accordance with claim 20, wherein said rigid foam is an epoxy.

35. A structure in accordance with claim 20, wherein most of said spars are arranged in vertical pairs in which adjacent spars are spaced from one another as viewed looking endwise into the structure.

36. A structure in accordance with claim 20, wherein said rigid foam is insoluble in hydrocarbons.

References Cited by the Examiner
UNITED STATES PATENTS

| | | | |
|---|---|---|---|
| 2,155,651 | 4/1939 | Goetzel | 75—222 |
| 2,773,792 | 12/1956 | Nebesar | 244—123 XR |
| 3,163,397 | 12/1964 | Gassman et al. | 170—159 |

FOREIGN PATENTS 720,956  12/1954  Great Britain.

OTHER REFERENCES

Simple Aerodynamics by Charles Monteith, The Ronald Press Co., New York, 1920, page 34. Call No TL 671 M6.

MILTON BUCHLER, *Primary Examiner.*

A. E. CORRIGAN, *Assistant Examiner.*